United States Patent
Kim et al.

(10) Patent No.: US 9,148,227 B2
(45) Date of Patent: Sep. 29, 2015

(54) REFLECTIVE COLORLESS OPTICAL TRANSMITTER

(71) Applicant: Electronics and Telecommunications Research Institute, Daejeon (KR)

(72) Inventors: Hyun Soo Kim, Daejeon (KR); Dong-Hun Lee, Daejeon (KR); Mi-Ran Park, Daejeon (KR); Byung-Seok Choi, Daejeon (KR); Kisoo Kim, Daejeon (KR); O-Kyun Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/258,699

(22) Filed: Apr. 22, 2014

(65) Prior Publication Data

US 2015/0125159 A1    May 7, 2015

(30) Foreign Application Priority Data

Nov. 5, 2013  (KR) .................. 10-2013-0133743

(51) Int. Cl.
  *H04B 10/00*   (2013.01)
  *H04B 10/50*   (2013.01)
  *H04B 10/516*  (2013.01)

(52) U.S. Cl.
  CPC ............ *H04B 10/501* (2013.01); *H04B 10/516* (2013.01)

(58) Field of Classification Search
  CPC .............................. H04B 10/501; H04B 10/516
  USPC ......................................................... 398/183
  See application file for complete search history.

(56) References Cited

U.S. PATENT DOCUMENTS 6,594,297 B1 *  7/2003  Hayakawa ................ 372/46.01
  7,359,638 B2    4/2008  Kim et al.
  2011/0116808 A1 * 5/2011 Talli et al. .................... 398/183

FOREIGN PATENT DOCUMENTS

KR    10-0442658 B1    8/2004
  WO    WO-2009/144691 A1   12/2009

OTHER PUBLICATIONS

K. Asaka, et al., "Lossless Electroabsorption Modulator Monolithically Integrated With a Semiconductor Optical Amplifier and a Passive Waveguide", IEEE Photonics Technology Letters, vol. 15, No. 5, May 2003.

(Continued)

*Primary Examiner* — Danny Leung
(74) *Attorney, Agent, or Firm* — Rabin & Berdo, P.C.

(57) ABSTRACT

Provided is a reflective colorless optical transmitter receiving a carrier signal, which is a continuous wave, and outputting a modulated optical signal. The reflective colorless optical transmitter includes a semiconductor optical amplifier (SOA) amplifying an input optical signal allowing the input optical signal to have a gain, an optical modulator connected to the SOA and outputting a modulated optical signal, a high reflectivity facet reflecting the modulated optical signal from the optical modulator, and a Bragg reflection mirror connected to the high reflectivity facet, the optical modulator, and the SOA in series, wherein a Bragg resonator is formed by the Bragg reflecting mirror and the high reflectivity facet.

15 Claims, 16 Drawing Sheets

(56) References Cited

OTHER PUBLICATIONS

D. Wolfson, et al., "Detailed Theoretical Investigation of the Input Power Dynamic Range for Gain-Clamped Semiconductor Optical Amplifier Gates at 10 Gb/s", IEEE Photonics Technology Letters, vol. 10, No. 9, Sep. 1998.

Hoin Kim, et al., "A Gain-Clamped SOA With Distributed Bragg Reflectors Fabricated Under Both Ends of Active Waveguide With Different Lengths", IEEE Photonics Technology Letters, vol. 16, No. 4, Apr. 2004.

Khurram Karim Qureshi, et al., "Gain Control of Semiconductor Optical Amplifier Using a Bandpass Filter in a Feedback Loop", IEEE Photonics Technology Letters, vol. 19, No. 18, Sep. 15, 2007.

D. Smith, et al., "Colourless 10Gb/s Reflective SOA-EAM with Low Polarization Sensitivity for Long-reach DWDM-PON Networks", ECOC 2009, Paper 8.6.3, Sep. 20-24, 2009.

Alan Naughton, et al., "Optimisation of SOA-REAMs for Hybrid DWDM-TDMA PON Applications", Optics Express B723, vol. 19, No. 26, Dec. 12, 2011.

* cited by examiner

REFLECTIVE COLORLESS OPTICAL TRANSMITTER

CROSS-REFERENCE TO RELATED APPLICATIONS

This U.S. non-provisional patent application claims priority under 35 U.S.C. §119 of Korean Patent Application No. 10-2013-0133743, filed on Nov. 5, 2013, the entire contents of which are hereby incorporated by reference.

BACKGROUND OF THE INVENTION

The present invention disclosed herein relates to a reflective colorless optical transmitter used for optical communication.

Recently as the ultra high speed internet and various multimedia services are emerged, a fiber to the home (FTTH) technology has been actively developed for connecting a telephone company to a home with an optical fiber to provide mass information transfer. In order to implement the FTTH, various types of optical subscriber networks are required. In implementing the FTTH, the most important conditions are lowering cost as well as mass transfer. The passive optical network (PON) is excellent in network management and maintenance due to characteristics of passive devices and is economy since several subscribers share to use optical fibers.

In particular, since different wavelengths are respectively allocated to different subscribers in a wavelength-division multiplexed (WDM)-PON scheme, security and extensibility are high. However, a light source, such as an expensive distributed feedback laser diode (DFB LD), is necessary which has a different wavelength for each subscriber, and, for wavelength management, a specific light source having a different wavelength for each subscriber is required to be in stock in preparation for failure. Accordingly, price competitiveness is lowered. Therefore, a colorless optical transmitter is necessary as a WDM-PON light source. Recently, as necessity for a colorless optical transmitter operable in an ultra high speed of 10 Gbps or higher is surfaced, a semiconductor optical amplifier (SOA) into which a reflective optical modulator is integrated has be massively researched.

Typically, in a PON, a reflective colorless optical transmitter is positioned in an optical network unit (ONU), and an input carrier light source for the reflective colorless optical transmitter is positioned in an optical line terminal (OLT). Accordingly, since optical power of the input carrier for the reflective colorless optical transmitter has different attenuations along various paths of an optical distribution network including an array waveguide grating, an optical splitter, and a feeding fiber, it is important that a reflective colorless optical transmitter generates a modulation signal without distortion even in a wide input optical power range.

SUMMARY OF THE INVENTION

The present invention provides a reflective colorless optical transmitter having saturation input optical power increased.

The present invention also provides a reflective colorless optical transmitter capable of reducing distortion of a modulated signal in a wide input optical power range.

Embodiments of the inventive concept provide reflective colorless optical transmitters receiving a carrier signal, which is a continuous wave, and outputting a modulated optical signal, including: a semiconductor optical amplifier (SOA) amplifying an input carrier signal to allow the input carrier signal to have a gain; an optical modulator connected to the SOA and outputting a modulated optical signal; a high reflectivity facet reflecting the modulated optical signal from the optical modulator; and a Bragg reflection mirror connected to the high reflectivity facet, the optical modulator, and the SOA in series, wherein a Bragg resonator is formed by the Bragg reflecting mirror and the high reflectivity facet.

In some embodiments, the carrier signal, which is the continuous wave, may have an optical path of passing through the Bragg reflection mirror, the SOA, and the optical modulator, being reflected by the high reflectivity facet, and passing through the optical modulator, the SOA, and the Bragg reflection mirror.

In other embodiments, the Bragg reflection mirror, the SOA, the optical modulator, and the high reflectivity facet may be integrated into a single semiconductor chip.

In still other embodiments, the Bragg reflection mirror, the SOA, and the optical modulator may include an optical waveguide layer disposed between upper and lower clad layers, and the optical waveguide layer comprises a passive waveguide layer of the Bragg reflection mirror, a gain layer of the SOA, and an absorption layer of the optical modulator.

In even other embodiments, the Bragg reflection mirror may include Bragg diffraction gratings formed in the lower or upper clad layer of the passive waveguide layer.

In yet other embodiments, the optical modulator may be an electroabsorption optical modulator. The Bragg wavelength of the Bragg diffraction gratings may be inside a gain curve of the SOA, outside a communication wavelength band, and outside an absorption curve of the electroabsorption optical modulator.

In further embodiments, the optical modulator may be a Mach-Zehnder or Michelson interferometer optical modulator. The Bragg wavelength of the Bragg diffraction gratings may be inside a gain curve of the SOA, outside a communication wavelength band, and at a long wavelength or a short wavelength from a central wavelength of the gain curve of the SOA. The reflective colorless optical transmitter may further include an anti-reflection facet connected to an input end of the Bragg reflection mirror.

In still further embodiments, the SOA, the optical modulator, and the high reflectivity facet may be integrated into a single semiconductor chip, and the Bragg reflection mirror is formed outside the semiconductor chip. The Bragg reflection mirror may be formed on a fiber Bragg grating, or a waveguide of polymer or silica. The Bragg reflection mirror may include Bragg diffraction gratings formed in the fiber Bragg grating, or in the waveguide of polymer or silica.

In even further embodiments, the reflective colorless optical transmitter may further include an anti-reflection facet between the SOA and the Bragg reflection mirror.

In yet further embodiments, the reflective colorless optical transmitter may further include a phase shifter between the Bragg reflection mirror and the high reflectivity facet.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
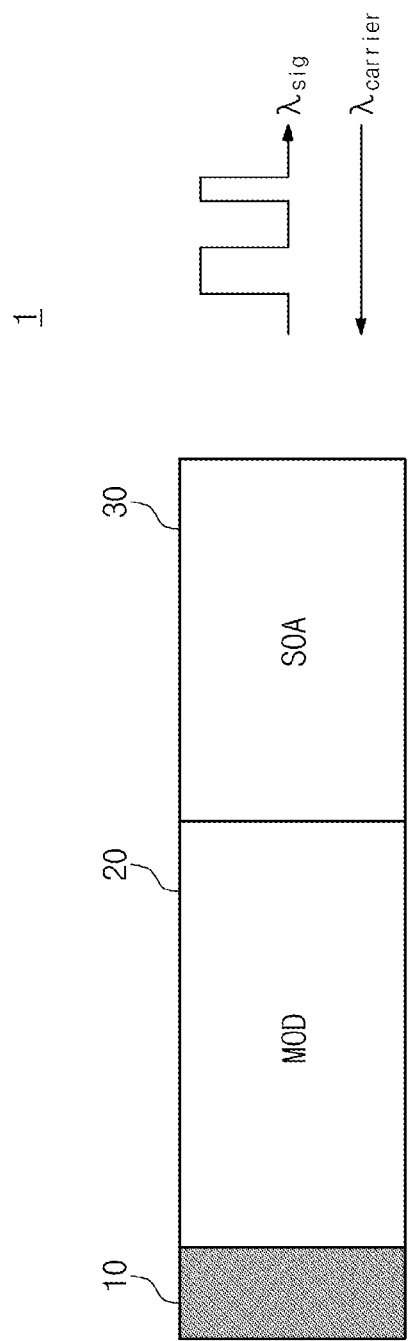
FIG. 1 is a block diagram schematically illustrating a reflective colorless optical transmitter.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Hereinafter, it will be described about an exemplary embodiment of the present invention in conjunction with the accompanying drawings. In the drawings, parts which are not related to the description are omitted to clearly set forth the present invention and similar elements are denoted by similar reference symbols throughout the specification.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional views and/or plan views that are schematic illustrations of example embodiments. In the drawings, the thicknesses of layers and regions are exaggerated for clarity. As such, variations from the shapes of the illustrations as a result, for example, of manufacturing techniques and/or tolerances, are to be expected. Thus, example embodiments should not be construed as limited to the particular shapes of regions illustrated herein but may be to include deviations in shapes that result, for example, from manufacturing. For example, an implanted region illustrated as a rectangle may, typically, have rounded or curved features. Thus, the regions illustrated in the figures are schematic in nature and their shapes may be not intended to illustrate the actual shape of a region of a device and are not intended to limit the scope of example embodiments.

FIG. 1 is a block diagram schematically illustrating a reflective colorless optical transmitter. Referring to FIG. 1, the reflective colorless optical transmitter 1 includes a high-reflectivity facet 10, an optical modulator (MOD) 20, and a semiconductor optical amplifier (SOA) 30.

The high-reflectivity facet 10, the MOD 20, and the SOA 30 may be connected in series. The high-reflectivity facet 10 reflects an optical signal, and the MOD 20 modulates an optical signal. Namely, the MOD 20 modulates a light from a light source properly to an optical communication medium. The SOA 30 amplifies an optical signal.

Referring to FIG. 1, a carrier signal $\lambda_{carrier}$ is input to the SOA 30. The carrier signal is amplified by the SOA 30 and modulated by the MOD 20. The modulated signal is reflected by the high reflectivity facet 10, the reflected signal is modulated again by the MOD 20, and then amplified again by the SOA 30 to be output. The carrier signal $\lambda_{carrier}$ may be a continuous wave (CW). The wavelengths of the carrier signal λcarrier and the modulated signal λsig may be the same.

Figure 2:
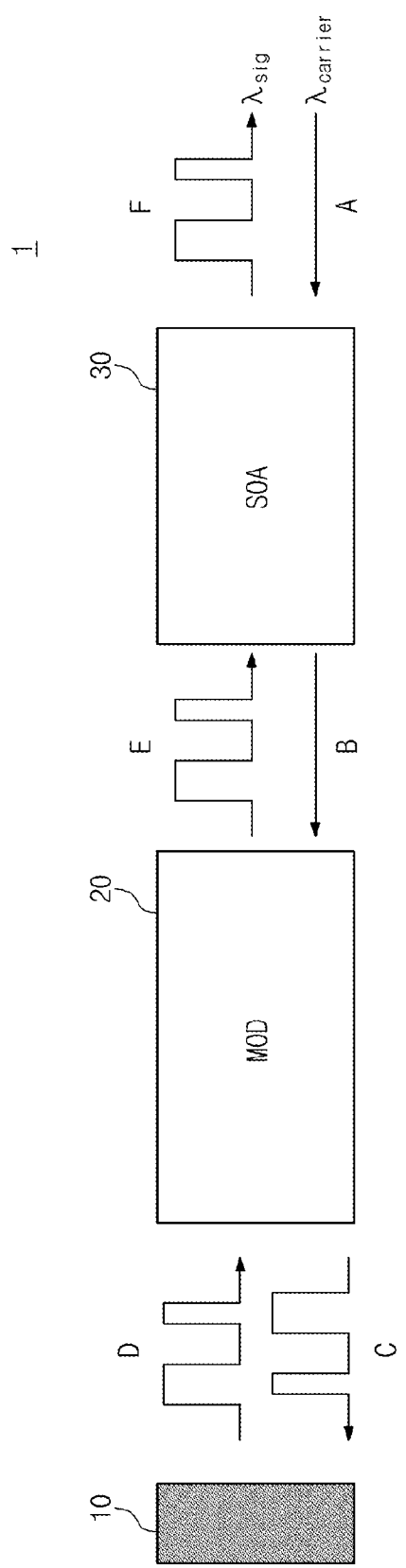
FIG. 2 is a block diagram illustrating in detail a traveling operation of a carrier signal λ carrier in the reflective colorless optical transmitter of FIG. 1.

FIG. 2 is a block diagram illustrating in detail a traveling operation of the carrier signal $\lambda_{carrier}$ in the reflective colorless optical transmitter of FIG. 1.

An input carrier signal ($\lambda_{carrier}$) A, which is a CW, is input to the SOA 30. The SOA 30 amplifies the input carrier signal ($\lambda_{carrier}$) A to output an amplified signal B. The signal B is input to the MOD 20. The MOD 20 modulates the signal B to output the modulated signal C. The signal C is reflected by the high-reflectivity facet 10 to be output. A signal D from the high-reflectivity facet 10 is input again to the MOD 20. The MOD 20 re-modulates the signal D to output the re-modulated signal E.

The signal E is re-input to the SOA 30. The SOA 30 amplifies the signal E and output the amplified signal F, $\lambda_{sig}$. When the modulate signal E is input to the SOA 30 and has optical power of gain saturation input optical power $P_{sat}$ or higher, a signal distortion phenomenon, such as overshooting, may occur. This kind of signal distortion phenomenon will be described in detail in relation to FIGS. 3 to 5.

Figure 3:
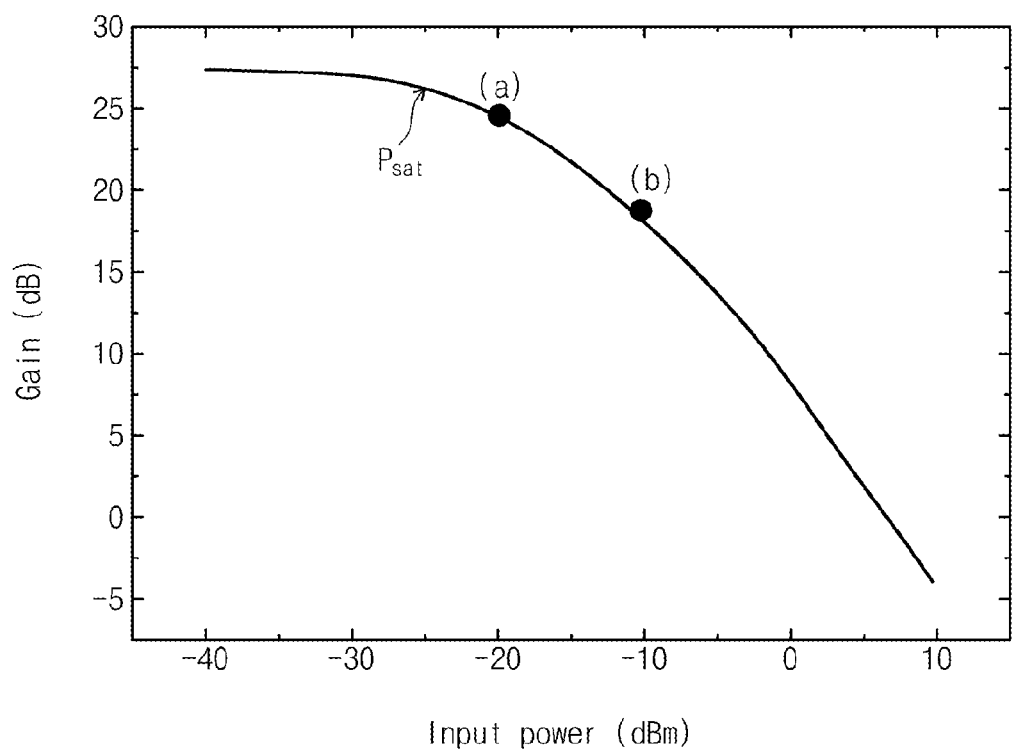
FIG. 3 is an exemplary graph illustrating a gain distribution curve of the reflective colorless optical transmitter of FIG. 1.

FIG. 3 is an exemplary graph showing a gain distribution curve of the reflective colorless optical transmitter of FIG. 1. In FIG. 3, a horizontal axis denotes input power and a vertical axis denotes a gain.

When a signal having predetermined power is input to the SOA 30, a gain is constant in low optical power, but a gain saturation phenomenon occurs that a gain gradually decreases when the optical power is gain saturation input optical power $P_{sat}$ or higher. Referring to FIG. 3, in the gain distribution curve of the reflective colorless optical transmitter 1, the gain saturation input optical power $P_{sat}$ is very low about −25 dBm.

Figure 4:
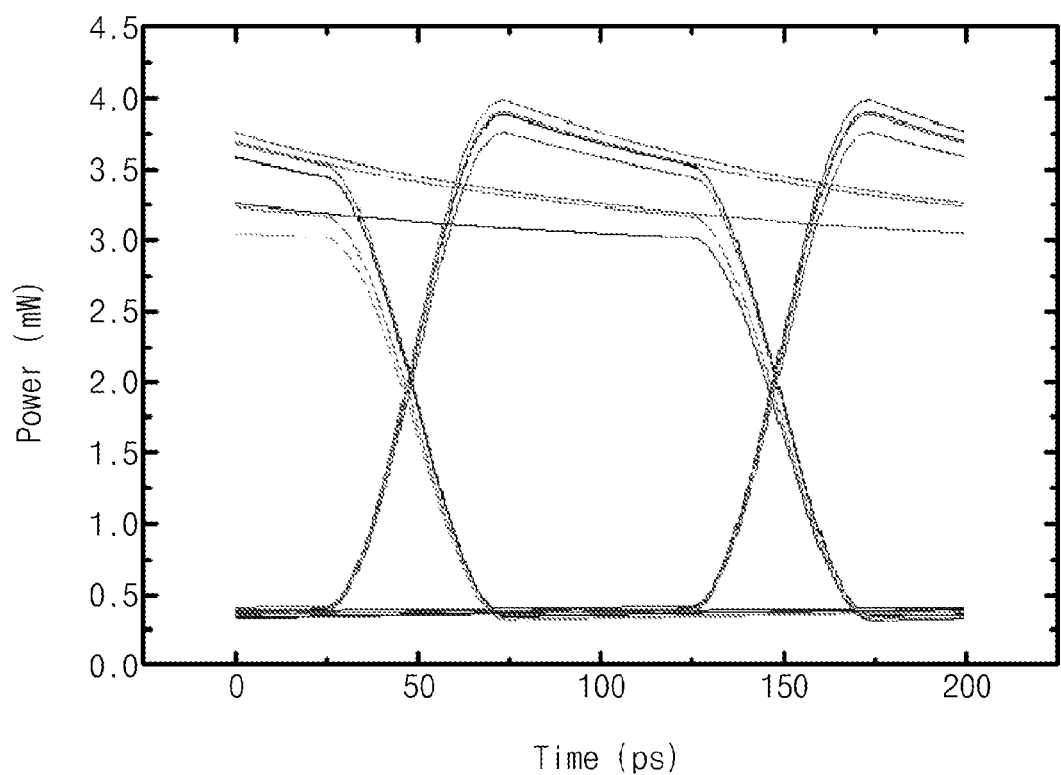
FIGS. 4 and 5 are graphs showing power of a modulated signal λ sig at portions (a) and (b) in FIG. 3 according to a time.
Figure 5:
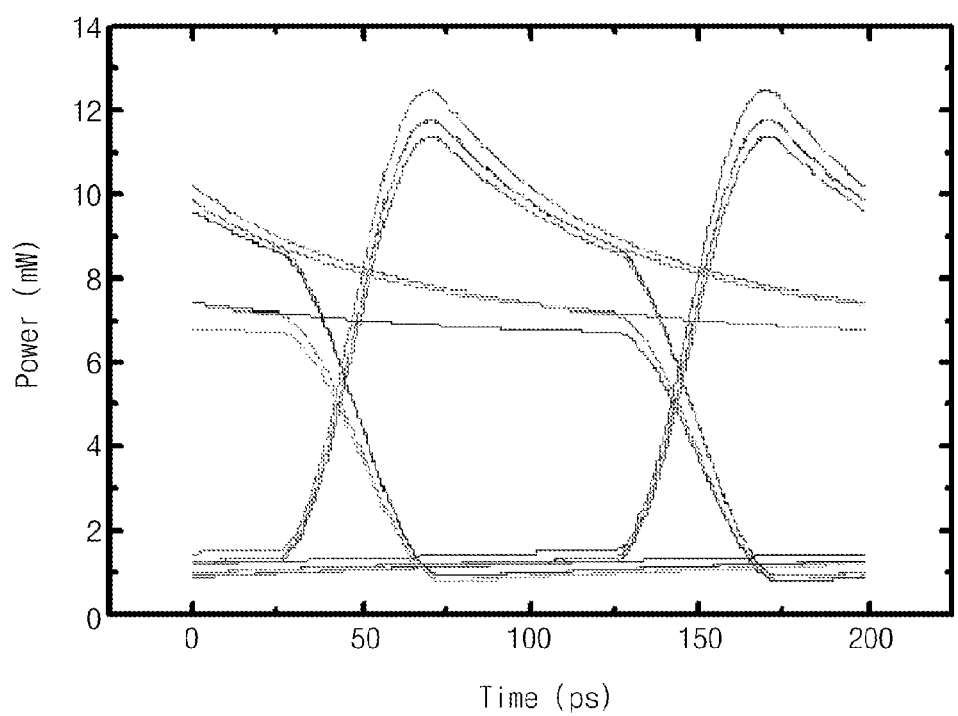

FIGS. 4 and 5 are graphs showing power of the modulated signal $?_{sig}$ at portions (a) and (b) of FIG. 3 according to a time. In the gain distribution curve of FIG. 3, when a signal having optical power of about −20 dBm to about −10 dBm, which is the gain saturation input optical power $P_{sat}$ or higher, is input, a signal distortion phenomenon, such as overshooting, may occur.

The signal distortion becomes factor degrading transmission characteristics by generating power penalty in the transmission characteristics of the modulated signal $?_{sig}$. The overshooting phenomenon is caused by gain saturation of the SOA 30. Accordingly, in order to remove or reduce the distortion, increasing the gain saturation input optical power $P_{sat}$ is necessary.

Figure 6:
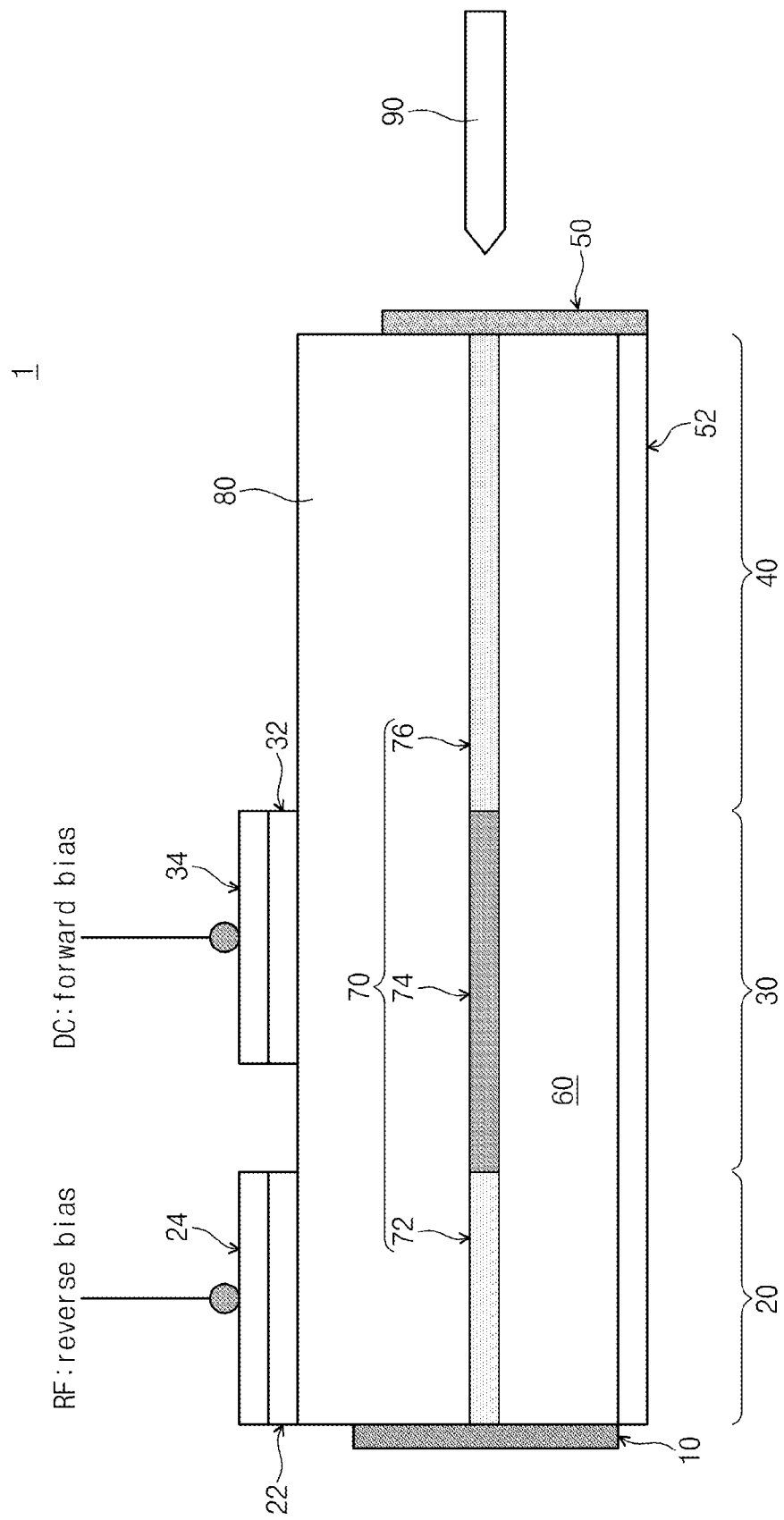
FIG. 6 is a cross-sectional view schematically illustrating a cross section of the reflective colorless optical transmitter of FIG. 1.

FIG. 6 is a cross-sectional view schematically illustrating a cross section of the reflective colorless optical transmitter of FIG. 1. Referring to FIG. 6, the reflective colorless optical transmitter 1 includes a high-reflectivity facet 10, an MOD 20, an SOA 30, and a spot size converter (SSC) 40. Furthermore, in order to reduce reflection of a light with being optically connected to an optical fiber 90, an anti-reflection facet 50 may be formed on an one end of the SSC 40.

Still referring to FIG. 6, a lower clad layer 60, an optical waveguide layer 70, and an upper clad layer 80 may be disposed on a lower electrode layer 52. The optical waveguide layer 70 may include an optical absorption layer 72 of the MOD 20, a gain layer 74 of the SOA 30, and a passive waveguide layer 76 of an optical mode converter 40. The optical absorption layer 72, the gain layer 74, and the passive waveguide layer 76 of the optical waveguide layer 70 may be butt jointed. The optical waveguide layer 70 may be aligned to the optical fiber 90.

The MOD 20 may include a first upper ohmic layer 22 and a first upper electrode layer 24. The SOA 30 may include a second upper ohmic layer 32 and a second upper electrode layer 34. The first and second ohmic layers 22 and 32 may be separated. The first and second upper electrode layer 24 and 34 may be also separated. Accordingly, the MOD 20 and the SOA 30 may be separated to enable independent current injection.

A forward DC bias may be applied to the gain layer 74 of the SOA 30. In addition, a reverse radio frequency (RF) bias may be applied to the optical absorption layer 72 of the MOD 20. The MOD 20 may absorb a light output from the gain layer 74 and output a modulated signal.

Typically, an electroabsorption optical modulator may modulate optical power by a Franz-Keldysh phenomenon or a Quantum Confinement Stark Effect (QCSE) phenomenon. The Franz-Keldysh phenomenon is a phenomenon that when a reverse voltage is applied, an absorption wavelength is transitioned to a long wavelength. A band gap of the optical absorption layer 72 of the MOD 20 may be designed toward a wavelength of about 40 nm to about 70 nm shorter than that of the gain layer 74 of the SOA 30. The optical absorption layer 72 of the MOD 20 may include an InGaAsP bulk or a multi-quantum well (MQW). In the optical absorption layer 72 of the MOD 20, absorption is small when the reverse bias is not applied. When the reverse bias is applied, an absorption loss is increased and optical modulation may occur.

Figure 7:
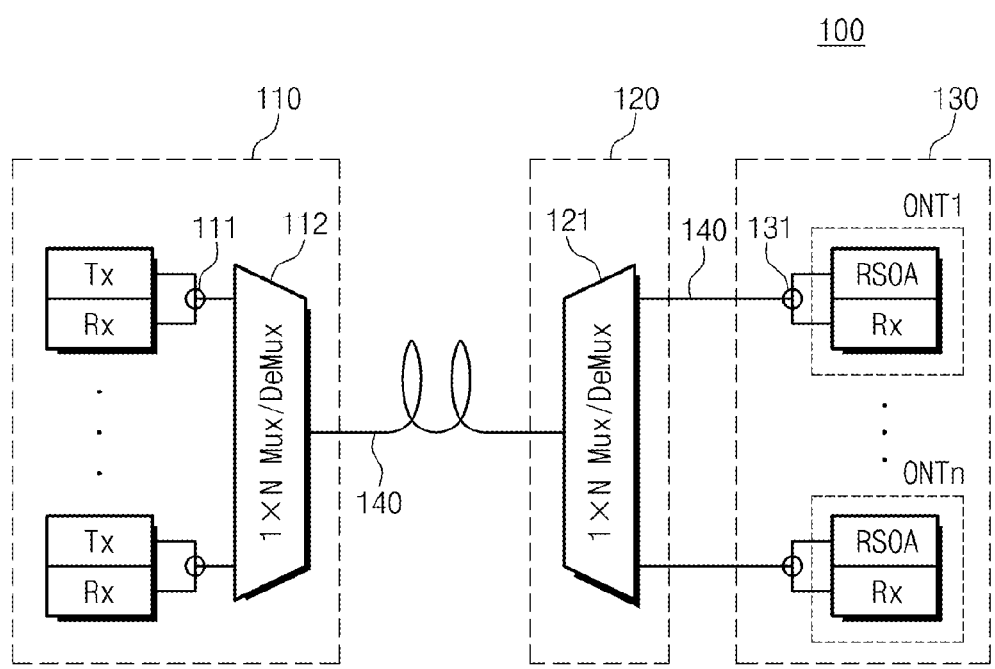
FIG. 7 is an exemplary block diagram illustrating a wavelength division multiplexed-passive optical network (WDM-PON) including a reflective colorless optical transmitter.

FIG. 7 is an exemplary block diagram illustrating a WDM-PON including a reflective colorless optical transmitter. Referring to FIG. 7, the WDM-PON 100 may include a central office 110, a remote node 120, an optical network terminal (ONT) 130, and an optical fiber 140.

The central office 110 may include an optical transmitting unit Tx for transmitting a downstream optical signal, an optical receiving unit Rx receiving an upstream optical signal, an optical coupler/splitter 111, and an optical multiplexer/demultiplexer (Mux/Demux) 112. Normally, a single mode light source (for example, a DFB LD) is used as the optical transmitting unit Tx of the central office 110. The downstream optical signal is input to the remote node 120 through the optical fiber 140. The downstream optical signal is demultiplexed for each wavelength by the optical Mux/Demux 121 of the remote node 120 and then transmitted to the ONT 130.

Still referring to FIG. 7, the ONT 130 includes a plurality of individual ONTs ONT1 to ONTn. Each of the individual ONTs ONT1 to ONTn may include the optical coupler/splitter 131, a reflective SOA (RSOA) having a reflective colorless optical transmitter for transmitting the upstream optical signal, and the optical receiver Rx for receiving the downstream optical signal. An upstream optical signal modulated by the RSOA is transmitted to the central office 110 through the remote node 120 and the optical fiber 140.

As described above, the reflective colorless optical transmitter 1 may include a high reflectivity facet 10, an MOD 20, an SOA 30, and an optical mode converter 40. The reflective colorless optical transmitter 1 is positioned in an ONT of the PON and an input carrier light source is positioned in an optical line terminal (OLT).

Accordingly, optical power of an input carrier of the reflective colorless optical transmitter 1 has different attenuations according to various paths of an optical distribution network (ODN) including an array waveguide grating (AWG), an optical splitter, and a feeding fiber. Due to these reasons, it is important that the reflective colorless optical transmitter 1 generates a modulated signal without distortion even in a wide input optical power. The reflective colorless optical transmitter using a gain clamping phenomenon may generate a modulated signal without distortion in a wide input optical power range.

Figure 8:
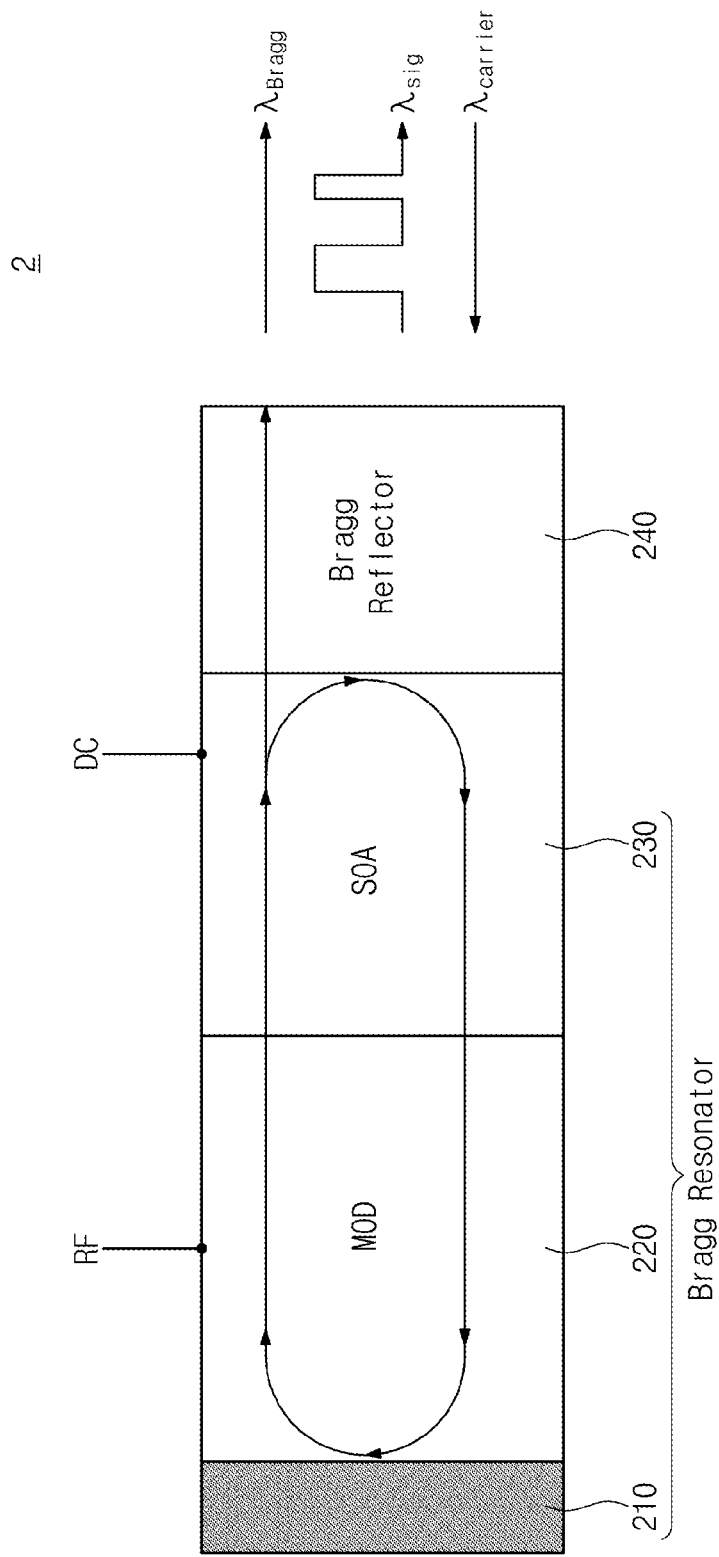
FIG. 8 is a block diagram illustrating a reflective colorless optical transmitter according to an embodiment of the present invention.

FIG. 8 is a block diagram illustrating a reflective colorless optical transmitter according to an embodiment of the present invention. The reflective colorless optical transmitter 2 shown in FIG. 8 includes a high reflectivity facet 210, an MOD 220, an SOA 230, and a Bragg reflection mirror 240.

Referring to FIG. 8, the high reflectivity facet 210, the MOD 220, the SOA 230, and the Bragg reflection mirror 240 may be connected in series. The high reflectivity facet 210 and the Bragg reflection mirror 240 are positioned at both ends of the MOD 220 and SOA 230. An amplified spontaneous emission (ASE) light generated in the SOA 230 are lased by a Bragg resonator formed with the Bragg reflection mirror 240 and the high reflectivity facet 210.

When a current injected into the SOA 230 is a threshold current or higher, a carrier concentration in the gain layer 74 (in FIG. 6) of the SOA 230 can be clamped as a carrier concentration corresponding to the threshold current of the Bragg resonator. All the carriers in the concentration corresponding to the threshold current or higher can be converted into a light lased by the Bragg resonator. Accordingly, even when an injection current is increased, a gain in a non-saturation region of the SOA may be clamped by the carrier concentration corresponding to the threshold current of the Bragg resonator. Due to this gain clamping phenomenon, a gain in non-saturation region is lowered compared to a typical semiconductor optical amplifier but gain saturation input optical power $P_{sat}$ is increased.

Figure 9:
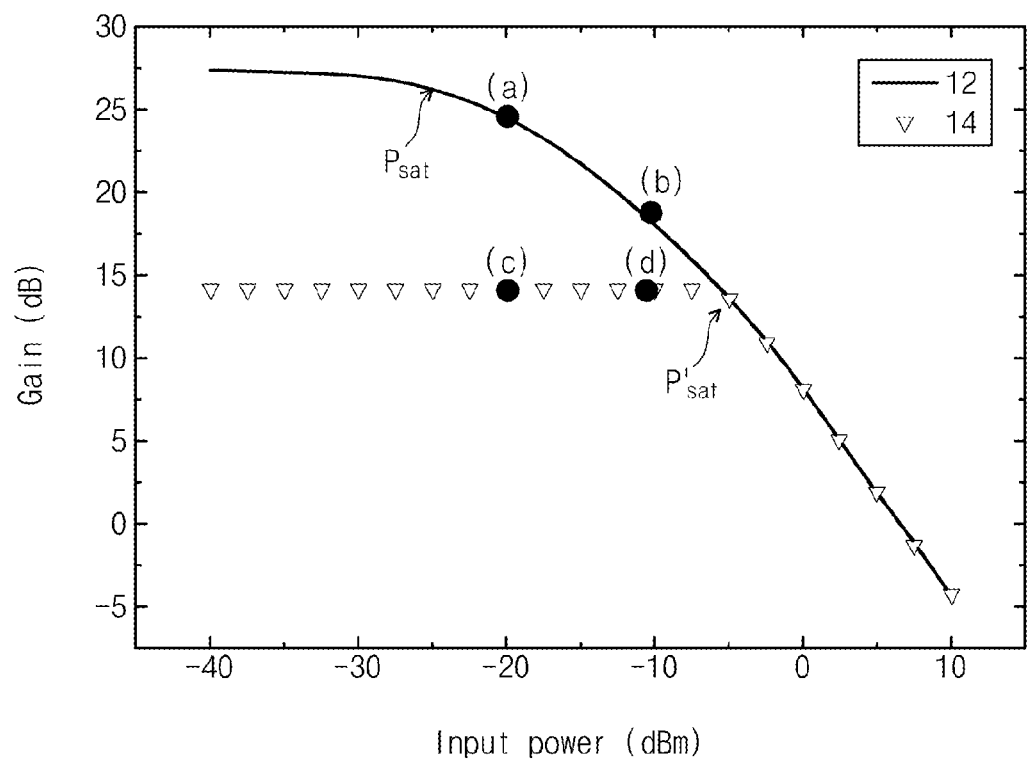
FIG. 9 is a graph showing gain distribution curves of the reflective colorless optical transmitters of FIGS. 8 and 1.

FIG. 9 is a graph showing gain distribution curves of the reflective colorless optical transmitters shown in FIGS. 8 and 1. In FIG. 9, a solid line 12 shows the gain distribution curve of the reflective colorless optical transmitter 1 of FIG. 1, and an inverted triangular line 14 shows the gain distribution curve of the reflective colorless optical transmitter 2 of FIG. 8.

Referring to the solid line 12 and the inverted triangular line 14 of FIG. 9, the reflective colorless optical transmitter 1 of FIG. 1 has the saturation input optical power of about −25 dBm, and the reflective colorless optical transmitter 2 of FIG. 8 has the saturation input optical power $P_{sat}$ of about −5 dBm. The saturation input optical power $P_{sat}$ of FIG. 8 has a value about 20 dBm higher compared to the saturation input optical power $P_{sat}$ of FIG. 1.

Figure 10:
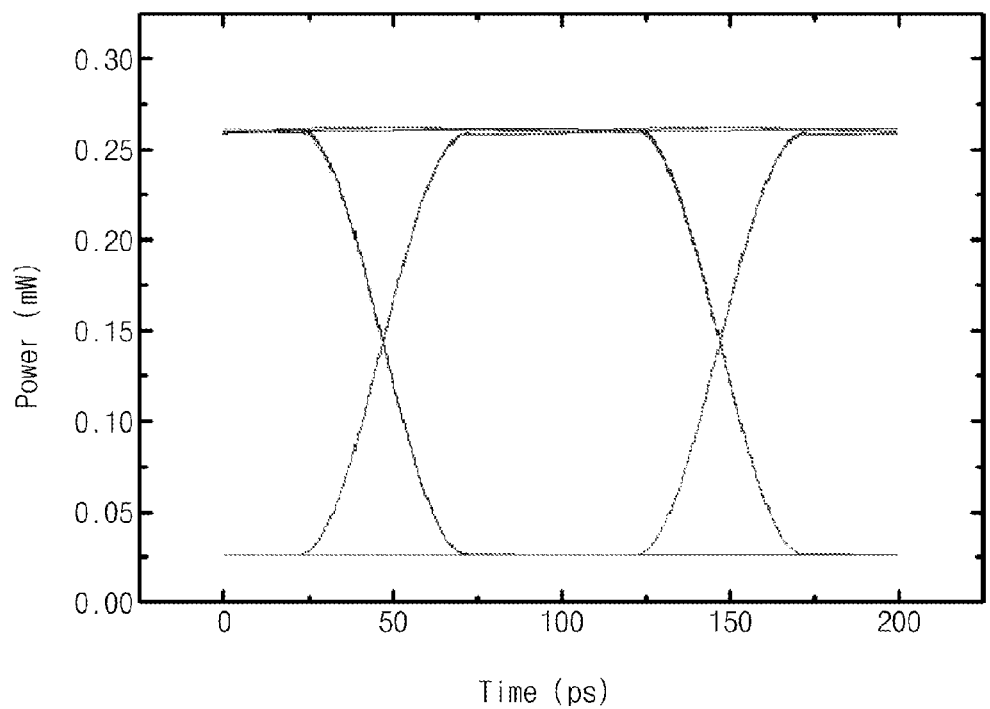
FIG. 10 is a graph showing power of a modulated signal at portion (c) of FIG. 9 according to a time.

FIG. 10 is a graph showing power of a modulated signal at portion (c) of FIG. 9 according to a time. Comparing to the graph (see FIG. 4) at portion (a) of FIG. 9, the reflective colorless optical transmitter 2 of an embodiment of the present invention has the saturation input optical power $P_{sat}$ of −5 dBm. Accordingly, when the input optical power is −20 dBm, the overshooting phenomenon does not occur.

Figure 11:
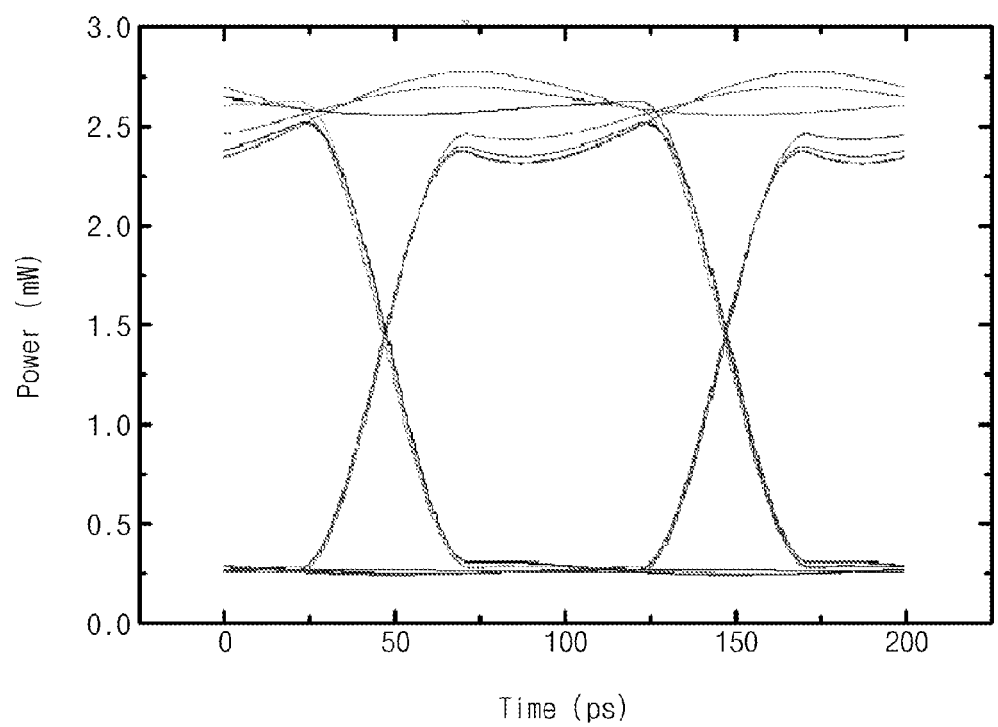
FIG. 11 is a graph showing power of a modulated signal at portion (d) of FIG. 9 according to a time.

FIG. 11 is a graph showing power of a modulated signal at portion (d) of FIG. 9 according to a time. Compared to the graph (see FIG. 5) at portion (b) of FIG. 9, the reflective colorless optical transmitter 2 of an embodiment of the present invention has the saturation input optical power $P_{sat}$ of −5 dBm. Accordingly, even when the input optical power is −10 dBm, the overshooting phenomenon scarcely occurs. The reflective colorless optical transmitter 2 of an embodiment of the present invention can reduce distortion of a modulated signal in a wide input optical power range.

Figure 12:
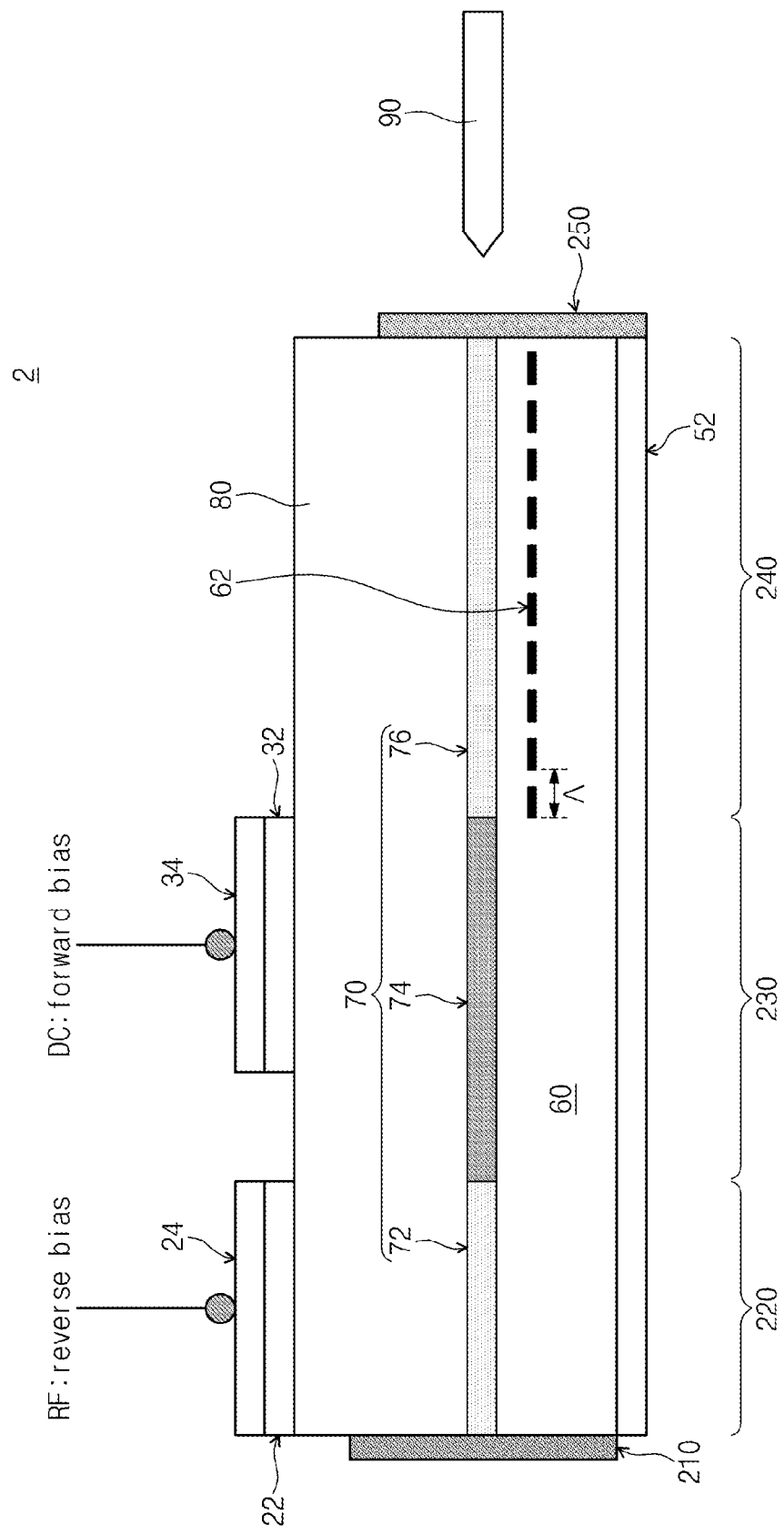
FIG. 12 is a cross-sectional view schematically illustrating a cross section of the reflective colorless optical transmitter of FIG. 8.

FIG. 12 is a cross-sectional view schematically illustrating a cross section of the reflective colorless optical transmitter shown in FIG. 8. Referring to FIG. 12, the reflective colorless optical transmitter 2 includes a high reflectivity facet 210, an MOD 220, an SOA 230, and a Bragg reflection mirror 240, which are connected in series.

The MOD 220 may be an electroabsorption modulator or an interferometer optical modulator. The interferometer optical modulator may be a Mach-Zehnder interferometer optical modulator or a Michelson interferometer optical modulator. FIG. 12 illustrates an exemplary electroabsorption modulator.

The MOD 220 may include a lower electrode layer 52, a lower clad layer 60, an optical absorption layer 72, an upper clad layer 80, a first upper ohmic layer 22, and a first upper electrode layer 24. The lower clad layer 60 may include an n-InP layer. The optical absorption layer 72 may include an intrinsic InGaAsP or MQW layer. The upper clad layer 80 may include a p-InP layer. The first upper ohmic layer may include a P$^+$-InGaAs layer. The lower electrode layer 52 and the first upper electrode layer 24 may include ohmic metal layers.

The SOA 230 may include a lower electrode layer 52, a lower clad layer 60, a gain layer 74, an upper clad layer 80, a second upper ohmic layer 32, and a second upper electrode layer 34. The gain layer 74 may include an intrinsic InGaAsP layer containing a gain material. The second upper ohmic layer 32 may include a P$^+$-InGaAs layer identical to the first upper ohmic layer 22. The second upper electrode layer 34 may include an ohmic metal layer.

In the reflective colorless optical transmitter 2 shown in FIG. 12, the Bragg reflection mirror 240 may be prepared by forming Bragg diffraction gratings 62 on or under the passive waveguide layer 76. The Bragg wavelength $\lambda_{Bragg}$ and period $\Lambda$ of the Bragg diffraction gratings 62 satisfies Equation (1):

$$\lambda_{Bragg} = 2 \times n_{eff} \times \Lambda \quad (1)$$

where $n_{eff}$× is an effective refractive index of the passive waveguide layer 76.

Referring to Equation (1), the reflective colorless optical transmitter 2 may adjust a Bragg wavelength by adjusting a period $\Lambda$ of the Bragg diffraction gratings 62. The reflective colorless optical transmitter 2 may form a Bragg resonator between the high reflectivity facet 210 and the Bragg reflection mirror 240 by adjusting the Bragg wavelength. Furthermore, the Bragg diffraction gratings 62 may be formed in the upper clad layer 80 or the lower clad layer 60 of the gain layer 74 of the SOA 230.

Figure 13:
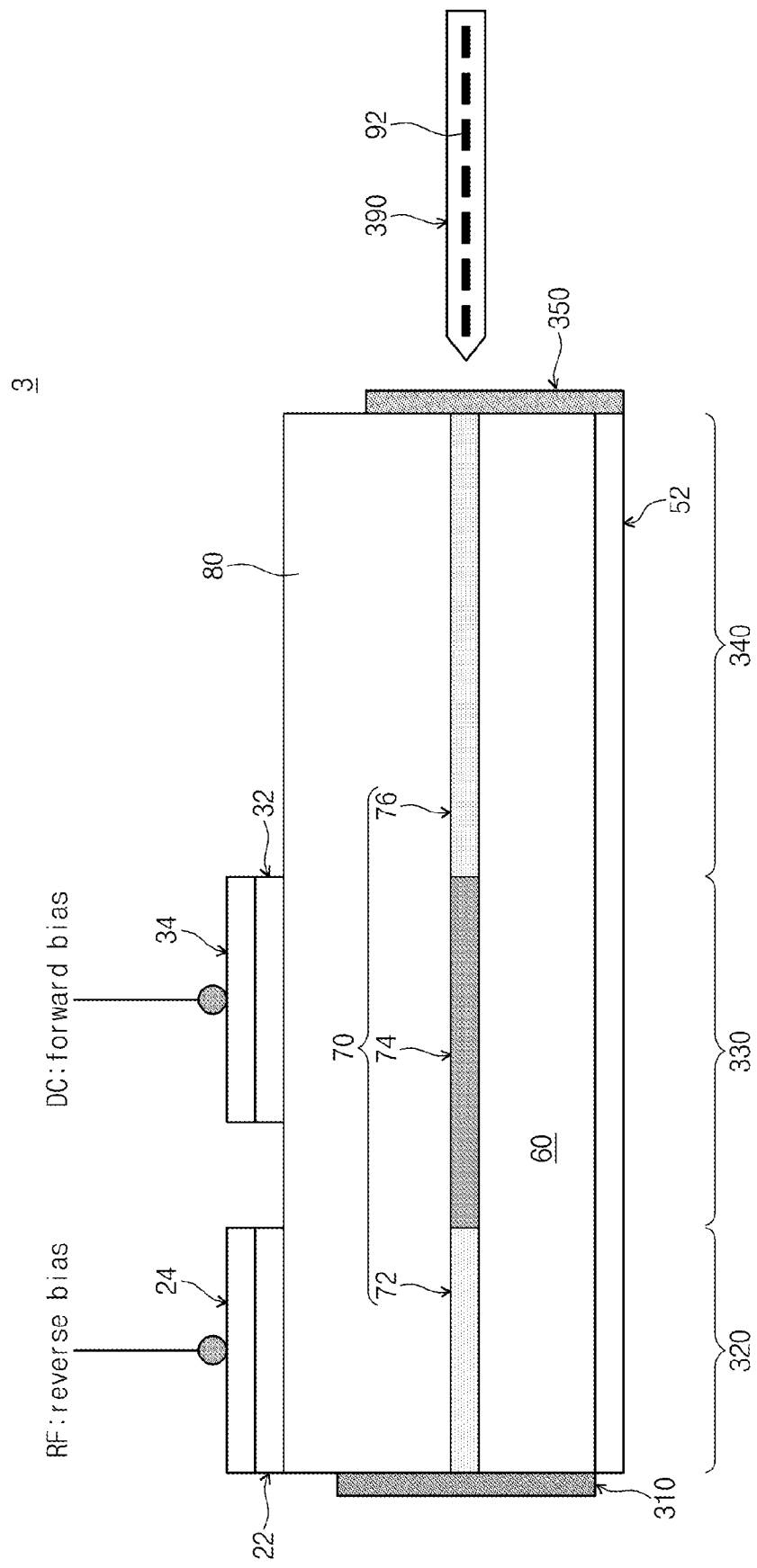
FIG. 13 is a cross-sectional view illustrating a cross section of a reflective colorless optical transmitter according to another embodiment of the present invention.

FIG. 13 is a cross-sectional view illustrating a reflective colorless optical transmitter according to another embodiment of the present invention. The reflective colorless optical transmitter 3 illustrated in FIG. 13 includes a high reflectivity facet 310, an MOD 320, an SOA 330, and an optical mode converter 340.

The reflective colorless optical transmitter 3 in FIG. 13 shows an example having a Bragg reflection mirror 390 outside a semiconductor chip, which is different from the reflective colorless optical transmitter 2 of FIG. 12 having the Bragg reflection mirror formed therein. The Bragg reflection mirror 390 is aligned with the optical waveguide layer 70 and has the Bragg diffraction gratings 92. The Bragg diffraction gratings 92 may be formed on a fiber Bragg grating or a planar lightwave circuit waveguide, such as polymer or silica.

Figure 14:
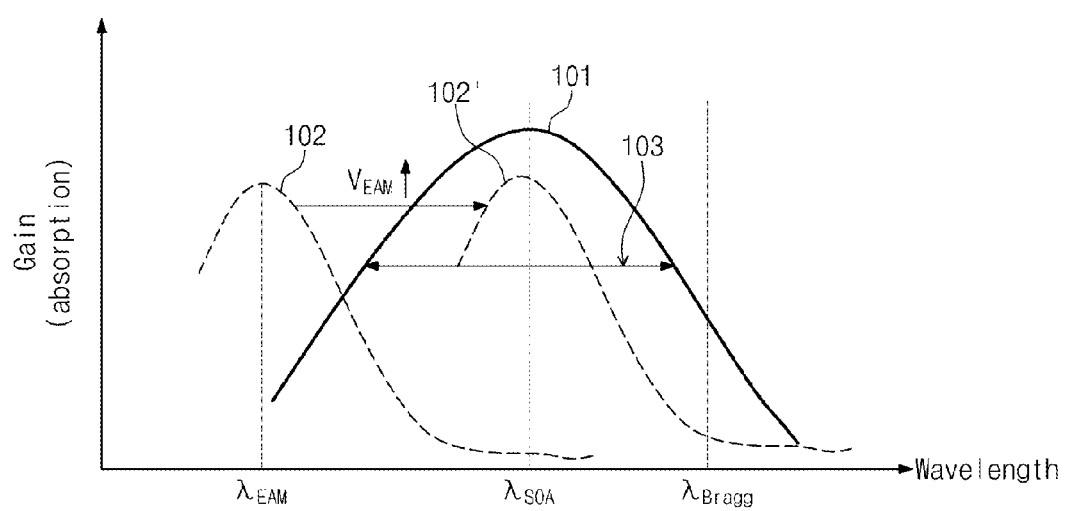
FIG. 14 is a graph showing a wavelength distribution when an optical modulator is an electroabsorption optical modulator in a reflective colorless optical transmitter according to an embodiment of the present invention.

FIG. 14 is a graph showing wavelength distribution when the optical modulator is an electroabsorption optical modulator in a reflective colorless optical transmitter according to an embodiment of the present invention.

Referring to FIG. 14, reference number 101 denotes a gain curve of the gain layer 74 of the SOA, and reference number 102 denotes an absorption curve of the optical absorption layer of the electroabsorption optical modulator (EAM). Reference number 102' is an absorption curve transitioned towards a long wavelength.

Here, the gain curve and the absorption curve are respectively distribution functions and may form Gaussian distribution curves. Reference number 103 denotes a communication wavelength band of the PON. $\lambda_{SOA}$, $\lambda_{EAM}$, and $\lambda_{Bragg}$ are respectively a gain curve central wavelength of an SOA, a central wavelength of an absorption curve of the SOA, and a Bragg wavelength corresponding to a period of the Bragg diffraction gratings 62 and 92. $\lambda_{SOA}$ is positioned at about 40 to 70 nm longer wavelength than $\lambda_{EAM}$, a full width at half maximum of the gain curve 101 of the SOA is about 30 to 40 nm. A wavelength band of the PON is about 30 nm. As a reverse bias is increased, the absorption curve 102 of the EAM may be transitioned towards a long wavelength to move to the absorption curve 102' due to a Franz-Kedysh or quantum confinement Start effect phenomenon.

Since the Bragg resonator includes the SOA and the electroabsorption optical modulator, it is better that an oscillation wavelength of the Bragg resonator is not absorbed into the electroabsorption optical modulator. Accordingly, the Bragg wavelength $\lambda_{Bragg}$ of the Bragg diffraction gratings 62 and 92 is necessary to be in the gain curve 101 of the SOA, outside the communication wavelength band 103, and outside the absorption curve 102 of the electroabsorption optical modulator.

Therefore, the Bragg wavelength $\lambda_{Bragg}$ of the Bragg diffraction gratings 62 and 92 is better to be in a wavelength region of about 30 to about 60 nm longer from the central wavelength $\lambda_{SOA}$ of the SOA. For this, the Bragg diffraction gratings 62 and 92 may have the period $\Lambda$ which is about 30 to about 60 nm longer than the central wavelength $\lambda_{SOA}$ of the SOA.

Figure 15:
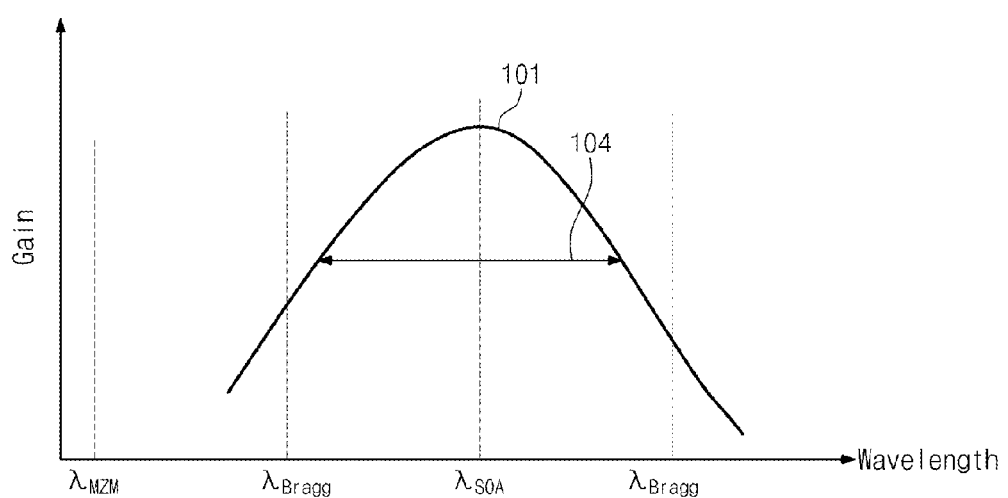
FIG. 15 is a graph showing a wavelength distribution when an optical modulator is a Mach-Zehnder or a Michelson interferometer optical modulator in a reflective colorless optical transmitter according to an embodiment of the present invention.

FIG. 15 is a graph showing wavelength distribution when the optical modulator is a Mach-Zehnder or Michelson interferometer optical modulator in a reflective colorless optical transmitter according to an embodiment of the present invention. The Mach-Zehnder or Michelson interferometer optical modulator does not use transition of an absorption curve of the electroabsorption optical modulator, but uses a refractive index change by applying a current or a voltage to the passive waveguide layer 76.

The band gap wavelength $\lambda_{MZM}$ of a waveguide used in the Mach-Zehnder or Michelson interferometer optical modulator is positioned at about 100 nm shorter wavelength region compared to the central wavelength $\lambda_{SOA}$ of the gain curve 101 of the SOA, and the absorption loss in the interferometer optical modulator is negligibly very small. Accordingly, the Bragg wavelength $\lambda_{Bragg}$ using the Bragg diffraction gratings 62 and 92 may be positioned at an about 30 to about 60 nm longer or shorter wavelength region from the central wavelength $\lambda_{SOA}$ of the gain curve 101 of the SOA.

That is, the period $\Lambda$ of the Bragg diffraction gratings 62 and 92 may be about 30 to about 60 nm shorter or longer from the central wavelength $\lambda_{SOA}$ in an operation wavelength band 104. Furthermore, since a light whose wavelength is $\lambda_{Bragg}$ generated by the Bragg resonator is largely attenuated by the AWG positioned at the PON distribution network, an additional removal device is not necessary.

Figure 16:
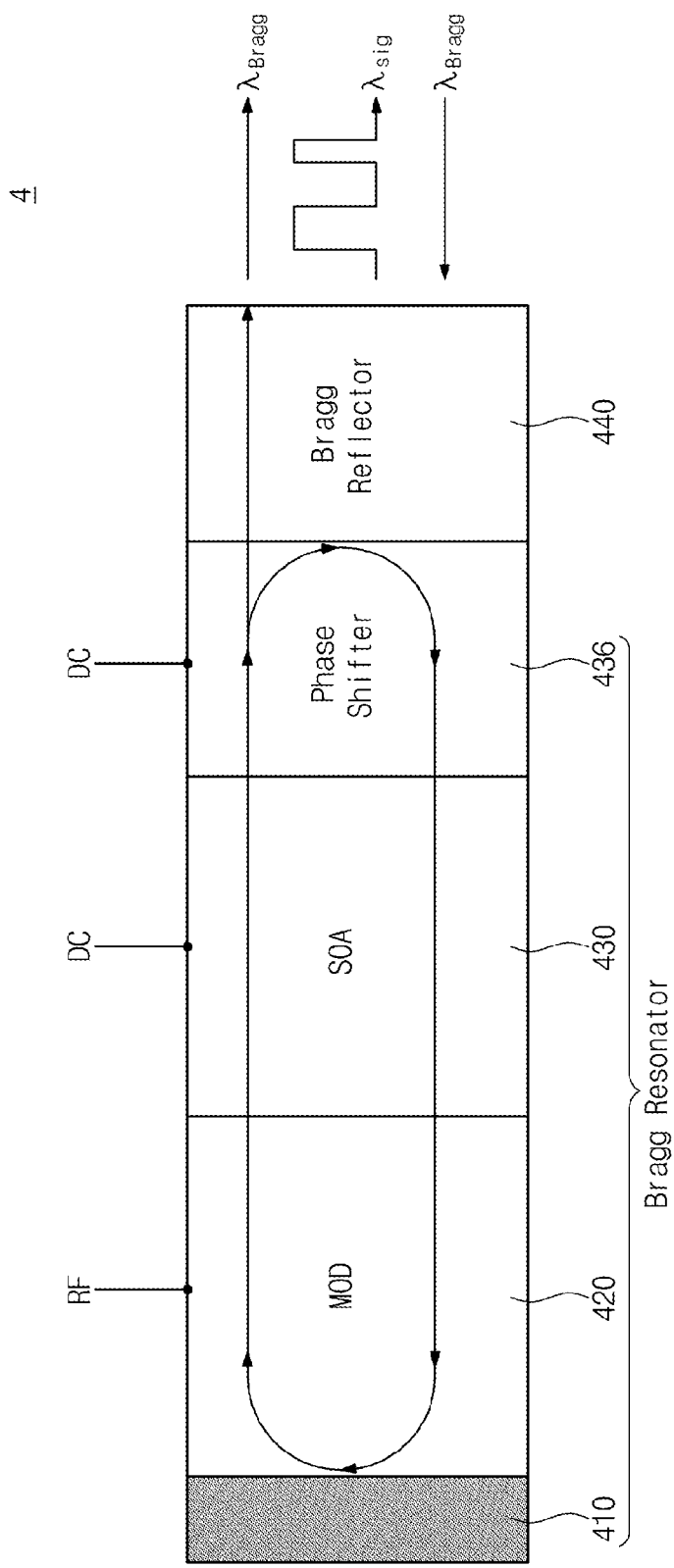
FIG. 16 is a block diagram schematically illustrating a reflective colorless optical transmitter according still another embodiment of the present invention.

FIG. 16 is a block diagram schematically illustrating a reflective colorless optical transmitter according to still another embodiment of the present invention. Referring to FIG. 16, the reflective colorless optical transmitter 4 includes a high reflectivity facet 410, an MOD 420, an SOA 430, a phase shifter 436, and a Bragg reflection mirror 440, which are connected in series.

Compared with the reflective colorless optical transmitter 2 of FIG. 8, the reflective colorless optical transmitter 4 of FIG. 16 further includes the phase shifter 436 between the SOA 430 and the Bragg reflection mirror 440. When a resonant length of the Bragg resonator is an integer multiple of a wavelength of a laser light, output power of the laser light becomes maximum. The phase shifter 436 may adjusts the resonant length in the Bragg resonator to be an integer multiple of the wavelength of the laser light.

A reflective colorless optical transmitter according to embodiments of the present invention may include a Bragg reflection mirror, a semiconductor optical amplifier, an optical modulator, and a high-reflectivity facet, which are connected in series. The Bragg reflection mirror and the high-reflectivity facet may form a Bragg resonator. When a current injected into the semiconductor optical amplifier is a threshold current or higher, a carrier concentration in a gain layer of the semiconductor optical amplifier can be clamped as a carrier concentration corresponding to a threshold current of the Bragg resonator. All carriers in the concentration corresponding to the threshold current or higher can be converted into a light lased by the Bragg resonator.

Due to this gain clamping phenomenon, a gain in non-saturation region is lowered compared to a typical semiconductor optical amplifier, but saturation input optical power is increased. Accordingly, a reflective colorless optical transmitter according to embodiments of the present invention can reduce distortion of a modulated signal $\lambda$sig in a wide input optical power range.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A reflective colorless optical transmitter receiving a carrier signal, which is a continuous wave, and outputting a modulated optical signal, comprising:
    a semiconductor optical amplifier (SOA) amplifying an input carrier signal to allow the input carrier signal to have a gain;
    an optical modulator connected to the SOA and outputting a modulated optical signal;
    a high reflectivity facet reflecting the modulated optical signal from the optical modulator; and
    a Bragg reflection mirror connected to the high reflectivity facet, the optical modulator, and the SOA in series,
    wherein a Bragg resonator is formed by the Bragg reflecting mirror and the high reflectivity facet.

2. The reflective colorless optical transmitter of claim 1, wherein the carrier signal, which is the continuous wave, has an optical path of passing through the Bragg reflection mirror, the SOA, and the optical modulator, being reflected by the high reflectivity facet, and having an optical path passing through the optical modulator, the SOA, and the Bragg reflection mirror.

3. The reflective colorless optical transmitter of claim 1, wherein the Bragg reflection mirror, the SOA, the optical modulator, and the high reflectivity facet are integrated into a single semiconductor chip.

4. The reflective colorless optical transmitter of claim 3, wherein the Bragg reflection mirror, the SOA, and the optical modulator comprise an optical waveguide layer disposed between upper and lower clad layers, and
    the optical waveguide layer comprises a passive waveguide layer of the Bragg reflection mirror, a gain layer of the SOA, and an absorption layer of the optical modulator.

5. The reflective colorless optical transmitter of claim 4, wherein the Bragg reflection mirror comprises Bragg diffraction gratings formed in the lower or upper clad layer of the passive waveguide layer.

6. The reflective colorless optical transmitter of claim 5, wherein the optical modulator is an electroabsorption optical modulator.

7. The reflective colorless optical transmitter of claim 6, wherein a Bragg wavelength of the Bragg diffraction gratings is inside a gain curve of the SOA, outside a communication wavelength band, and outside an absorption curve of the electroabsorption optical modulator.

8. The reflective colorless optical transmitter of claim 5, wherein the optical modulator is a Mach-Zehnder or Michelson interferometer optical modulator.

9. The reflective colorless optical transmitter of claim 8, wherein a Bragg wavelength of the Bragg diffraction gratings is inside a gain curve of the SOA, outside a communication wavelength band, and at a long wavelength or a short wavelength from a central wavelength of the gain curve of the SOA.

10. The reflective colorless optical transmitter of claim 3, further comprising an anti-reflection facet connected to an input end of the Bragg reflection mirror.

11. The reflective colorless optical transmitter of claim 1, wherein the SOA, the optical modulator, and the high reflectivity facet are integrated into a single semiconductor chip, and
    the Bragg reflection mirror is formed outside the semiconductor chip.

12. The reflective colorless optical transmitter of claim of claim 11, wherein the Bragg reflection mirror is formed on a fiber Bragg grating, or a waveguide of polymer or silica.

13. The reflective colorless optical transmitter of claim 12, wherein the Bragg reflection mirror comprises Bragg diffraction gratings formed in the fiber Bragg grating, or in the waveguide of polymer or silica.

14. The reflective colorless optical transmitter of claim 11, further comprising an anti-reflection facet between the SOA and the Bragg reflection mirror.

15. The reflective colorless optical transmitter of claim 1, further comprising a phase shifter between the Bragg reflection mirror and the high reflectivity facet.

\* \* \* \* \*